US010185110B2

(12) United States Patent
Kaneko et al.

(10) Patent No.: US 10,185,110 B2
(45) Date of Patent: Jan. 22, 2019

(54) OPTICAL FIBER RIBBON, OPTICAL FIBER CABLE, AND METHOD FOR PRODUCING OPTICAL FIBER RIBBON

(71) Applicant: FUJIKURA LTD., Tokyo (JP)

(72) Inventors: Soichiro Kaneko, Sakura (JP); Mizuki Isaji, Sakura (JP); Ken Osato, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 15/101,238

(22) PCT Filed: Nov. 5, 2015

(86) PCT No.: PCT/JP2015/081129
§ 371 (c)(1),
(2) Date: Jun. 2, 2016

(87) PCT Pub. No.: WO2016/080195
PCT Pub. Date: May 26, 2016

(65) Prior Publication Data
US 2016/0299310 A1   Oct. 13, 2016

(30) Foreign Application Priority Data
Nov. 20, 2014   (JP) .................................. 2014-235500

(51) Int. Cl.
*G02B 6/44*   (2006.01)

(52) U.S. Cl.
CPC ............. *G02B 6/4482* (2013.01); *G02B 6/44* (2013.01); *G02B 6/4403* (2013.01); *G02B 6/448* (2013.01)

(58) Field of Classification Search
CPC ................................. G02B 6/44; G02B 6/4482
(Continued)

(56) References Cited

U.S. PATENT DOCUMENTS 4,751,613 A * 6/1988 Werdin ................ H05K 1/0218
                                                            361/799
4,980,007 A * 12/1990 Ferguson ............... G02B 6/448
                                                            156/178
(Continued)

FOREIGN PATENT DOCUMENTS

CA          2911402 A1    11/2014
CN        102681119 A      9/2012
(Continued)

OTHER PUBLICATIONS

International Search Report of PCT/JP2015/081129 dated Feb. 2, 2016 [PCT/ISA/210].
(Continued)

*Primary Examiner* — Kaveh C Kianni
(74) *Attorney, Agent, or Firm* — Sughrue Mion, PLLC

(57) ABSTRACT

To improve identifiability of optical fiber ribbons, an exemplary optical fiber ribbon of the invention includes: at least three optical fibers arranged side by side; and a plurality of connection parts that each connect two adjacent ones of the optical fibers, the connection parts being provided intermittently in a length direction of the optical fibers and in a width direction of the optical fibers. A marking for identifying the optical fiber ribbon is provided to each optical fiber. The position, in the circumferential direction, of the marking provided to at least one of the optical fibers is different from the position, in the circumferential direction, of the marking provided to another optical fiber.

4 Claims, 10 Drawing Sheets

(58) Field of Classification Search
USPC .......................................................... 385/52
See application file for complete search history.

(56) References Cited

U.S. PATENT DOCUMENTS

| | | | | |
|---|---|---|---|---|
| 5,076,881 | A * | 12/1991 | Ferguson | G02B 6/448 156/179 |
| 5,379,363 | A | 1/1995 | Bonicel et al. | |
| 5,412,497 | A * | 5/1995 | Kaetsu | G02B 6/4452 385/134 |
| 5,920,664 | A * | 7/1999 | Hirabayashi | G02B 6/43 349/196 |
| 6,305,848 | B1 * | 10/2001 | Gregory | G02B 6/4246 385/134 |
| 6,404,972 | B1 | 6/2002 | Pasch et al. | |
| 6,532,155 | B2 * | 3/2003 | Green | G02B 6/4277 361/730 |
| 6,584,257 | B1 * | 6/2003 | Hurley | G02B 6/4471 385/109 |
| 6,654,515 | B2 * | 11/2003 | Kato | G02B 6/43 385/129 |
| 6,868,219 | B2 * | 3/2005 | Lipski | G02B 6/4452 385/135 |
| 6,952,532 | B2 * | 10/2005 | Dair | G02B 6/4214 385/88 |
| 7,116,912 | B2 * | 10/2006 | Pang | G02B 6/4201 385/92 |
| 2001/0002943 | A1 * | 6/2001 | Nagayama | C03B 37/0253 385/100 |
| 2001/0030855 | A1 * | 10/2001 | Green | G02B 6/4277 361/754 |
| 2002/0028048 | A1 * | 3/2002 | Dair | G02B 6/4214 385/92 |
| 2002/0030872 | A1 * | 3/2002 | Dair | G02B 6/4214 398/135 |
| 2002/0033979 | A1 * | 3/2002 | Dair | G02B 6/4214 398/164 |
| 2002/0197032 | A1 * | 12/2002 | Conrad | G02B 6/4482 385/114 |
| 2003/0016924 | A1 * | 1/2003 | Thompson | G02B 6/4482 385/114 |
| 2003/0020986 | A1 * | 1/2003 | Pang | G02B 6/4201 398/139 |
| 2003/0053786 | A1 * | 3/2003 | Kato | G02B 6/43 385/134 |
| 2004/0069997 | A1 * | 4/2004 | Dair | G02B 6/4214 257/81 |
| 2006/0045417 | A1 * | 3/2006 | Morita | H04B 10/801 385/31 |
| 2006/0211294 | A1 * | 9/2006 | Lipski | G02B 6/4452 439/488 |
| 2008/0199134 | A1 | 8/2008 | Cook | |
| 2011/0110635 | A1 * | 5/2011 | Toge | G02B 6/4403 385/102 |
| 2013/0028563 | A1 * | 1/2013 | Matsuzawa | G02B 6/4482 385/120 |
| 2013/0343712 | A1 | 12/2013 | Matsuzawa et al. | |
| 2014/0016905 | A1 | 1/2014 | Tanabe et al. | |
| 2016/0070079 | A1 | 3/2016 | Sajima et al. | |
| 2016/0161692 | A1 | 6/2016 | Namazue et al. | |
| 2017/0115461 | A1 | 4/2017 | Namazue et al. | |
| 2017/0184803 | A1 | 6/2017 | Namazue et al. | |

FOREIGN PATENT DOCUMENTS

| | | |
|---|---|---|
| CN | 102844694 A | 12/2012 |
| CN | 103392140 A | 11/2013 |
| CN | 103890628 A | 6/2014 |
| JP | 02-033010 U | 3/1990 |
| JP | 2012-27317 A | 2/2012 |
| JP | 2012-173603 A | 9/2012 |
| JP | 2012208443 A | 10/2012 |
| JP | 2012-234122 A | 11/2012 |
| JP | 2013-088619 A | 5/2013 |
| JP | 2013-097350 A | 5/2013 |
| JP | 2014-157382 A | 8/2014 |
| WO | 2011/132610 A1 | 10/2011 |
| WO | 2013/065640 A1 | 5/2013 |
| WO | 2014181730 A1 | 11/2014 |

OTHER PUBLICATIONS

Communication dated Sep. 13, 2017 from the European Patent Office in counterpart application No. 15861486.7.
Communication dated Apr. 27, 2017, issued by the Canadian Intellectual Property Office in counterpart application No. 2,930,793.
International Preliminary Report on Patentability dated Jun. 1, 2017 in counterpart application No. PCT/JP2015/081129.
The First Office Action, dated May 25, 2018, issued in corresponding Chinese Application No. 201580004493.9, 13 pages in English and Chinese.

* cited by examiner (REFERENCE EXAMPLE)

(REFERENCE EXAMPLE)

OPTICAL FIBER RIBBON, OPTICAL FIBER CABLE, AND METHOD FOR PRODUCING OPTICAL FIBER RIBBON

CROSS REFERENCE TO RELATED APPLICATIONS

This application is a National Stage of International Application No. PCT/JP2015/081129, filed Nov. 5, 2015, claiming priority based on Japanese Patent Application No. 2014-235500, filed Nov. 20, 2014, the contents of all of which are incorporated herein by reference in their entirety.

TECHNICAL FIELD

The present invention relates to an optical fiber ribbon provided with markings.

BACKGROUND ART

Markings are provided to optical fibers of an optical fiber ribbon in order to identify a specific optical fiber ribbon from among a plurality of optical fiber ribbons. Patent Literature 1 discloses an optical fiber ribbon in which a marking is provided such that the marking substantially makes a full round around the circumferential surface of an optical fiber. Patent Literature 2 discloses an optical fiber ribbon in which a marking is provided only to a portion, in the circumferential direction, of a cover layer.

CITATION LIST

Patent Literature

Patent Literature 1: JP 2013-88619A
Patent Literature 2: JP 2012-173603A

SUMMARY OF INVENTION

Technical Problem

In the optical fiber ribbon disclosed in Patent Literature 1, the outer diameter of each optical fiber is increased at the marking section. This increase in diameter may heighten the possibility of an increase in optical transmission loss caused by distortion, and may also heighten the possibility of clogging/blocking etc. in a die during the steps for coloring and/or ribbon-forming. Moreover, it is difficult to produce an optical fiber ribbon while printing markings to substantially the entire circumferential surface of the respective optical fibers. Even if it were possible to provide markings to the entire circumference of the respective optical fibers, there would be an increase in the amount of ink used.

On the other hand, in cases where a marking is provided only partially in the circumferential direction as in the optical fiber ribbon disclosed in Patent Literature 2, the marking cannot be visually recognized, for example, when viewed from the opposite side from where the marking is provided. This may impair the identifiability of the optical fiber ribbon.

An objective of the invention is to improve identifiability of optical fiber ribbons.

Solution to Problem

A primary aspect of the invention for achieving the aforementioned objective is an optical fiber ribbon including: at least three optical fibers arranged side by side; and a plurality of connection parts that each connect two adjacent ones of the optical fibers, the connection parts being provided intermittently in a length direction of the optical fibers and in a width direction of the optical fibers. A marking for identifying the optical fiber ribbon is provided to each optical fiber. The position, in the optical fiber's circumferential direction, of the marking provided to at least one of the optical fibers is different from the position, in the optical fiber's circumferential direction, of the marking provided to another optical fiber.

Other features of the invention are disclosed in the following Description and Drawings.

Advantageous Effects of Invention

The present invention can improve identifiability of optical fiber ribbons.

DESCRIPTION OF EMBODIMENTS

Figure 1:
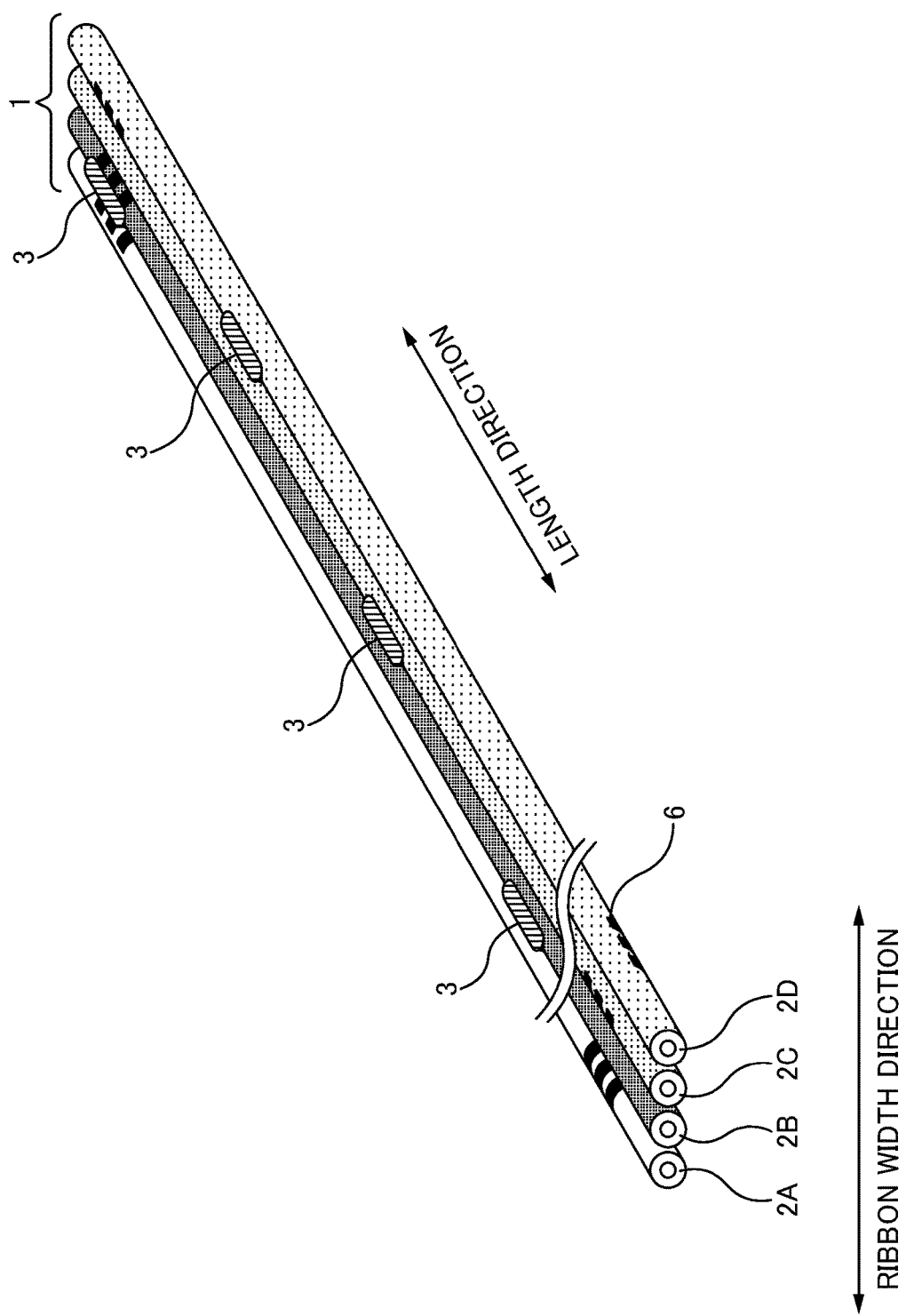
FIG. 1 is a perspective view of an optical fiber ribbon 1 according to an embodiment.

At least the following matters are disclosed in the Description and Drawings below.

Disclosed is an optical fiber ribbon including: at least three optical fibers arranged side by side; and a plurality of connection parts that each connect two adjacent ones of the optical fibers, the connection parts being provided intermittently in a length direction of the optical fibers and in a width direction of the optical fibers. A marking for identifying the optical fiber ribbon is provided to each optical fiber. The position, in the optical fiber's circumferential direction, of the marking provided to at least one of the optical fibers is different from the position, in the optical fiber's circumferential direction, of the marking provided to another optical fiber.

According to the aforementioned optical fiber ribbon, the position, in the circumferential direction, of the marking provided to at least one of the optical fibers is different from the position, in the circumferential direction, of the marking provided to another optical fiber. Therefore, even in cases where a marking of a certain optical fiber is blocked by adjacent optical fibers and is difficult to observe, the marking on another optical fiber can be visually recognized. Thus, the identifiability of the optical fiber ribbon can be improved.

It is preferable that: a plurality of the markings are provided respectively at different positions in the length direction of a certain one of the optical fibers; and the markings of the certain optical fiber are formed respectively at different positions in the circumferential direction. In this way, it is possible to make the position, in the circumferential direction, of the marking provided to at least one of the optical fibers different from the position, in the circumferential direction, of the marking provided to another optical fiber.

It is preferable that: a colored layer is formed on each of the optical fibers, the colored layers of the respective optical fibers having different colors from one another; and each marking is formed under the colored layer. In this way, the marking is protected by the colored layer, and thus, the marking can be made less prone to come off.

Also disclosed is an optical fiber cable made by covering a plurality of the aforementioned optical fiber ribbons with a sheath. Thus, it is possible to provide an optical fiber cable including optical fiber ribbons having improved identifiability.

Also disclosed is a method for producing an optical fiber ribbon, the method involving: a printing step of printing a marking for identifying the optical fiber ribbon to a portion, in a length direction, of an optical fiber; and a ribbon-forming step of forming the optical fiber ribbon by intermittently applying a resin to a plurality of the optical fibers and curing the resin in a state where a position, in the optical fiber's circumferential direction, of the marking provided to at least one of the optical fibers is made different from a position, in the optical fiber's circumferential direction, of the marking provided to another optical fiber.

According to an optical fiber ribbon produced by the aforementioned production method, the position, in the circumferential direction, of the marking provided to at least one of the optical fibers is different from the position, in the circumferential direction, of the marking provided to another optical fiber. Therefore, even in cases where a marking of a certain optical fiber is blocked by adjacent optical fibers and is difficult to observe, the marking on another optical fiber can be visually recognized. Thus, the identifiability of the optical fiber ribbon can be improved.

It is preferable that, in the printing step, the markings are printed by transferring an ink from a roller respectively to a plurality of the optical fibers. In this way, markings can be printed respectively onto a plurality of optical fibers at high speed.

Figure 2A:
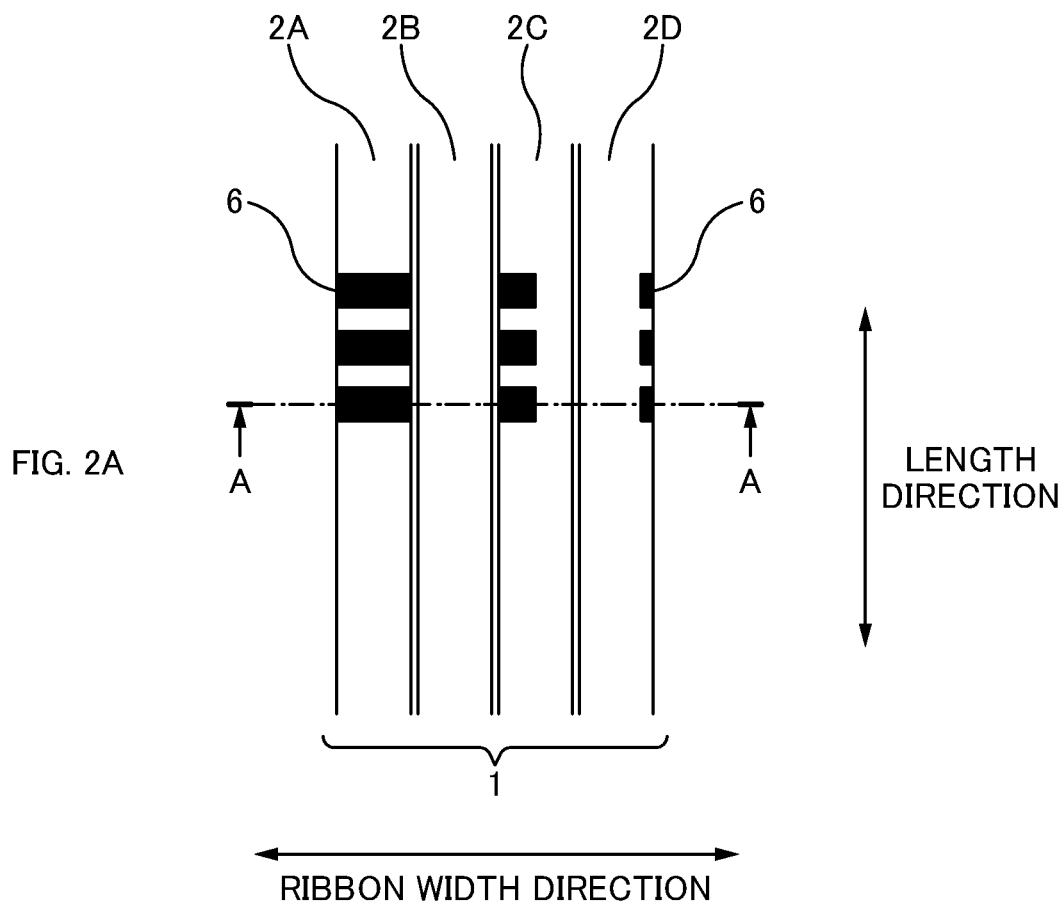
FIG. 2A is a plan view of an optical fiber ribbon according to an embodiment.
Figure 2B:
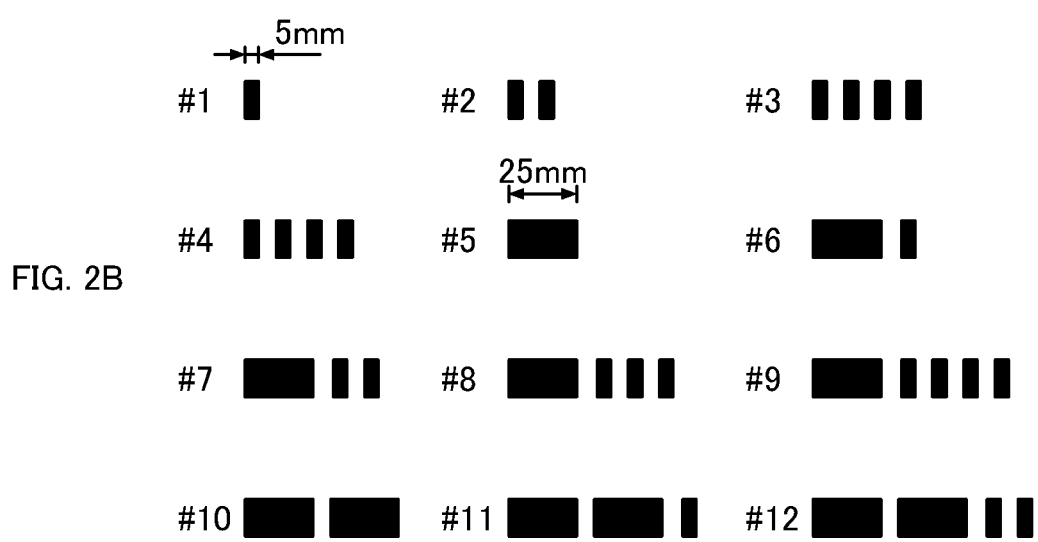
FIG. 2B is a diagram illustrating examples (Identification Nos. 1 to 12) of markings 6.
Figure 3:
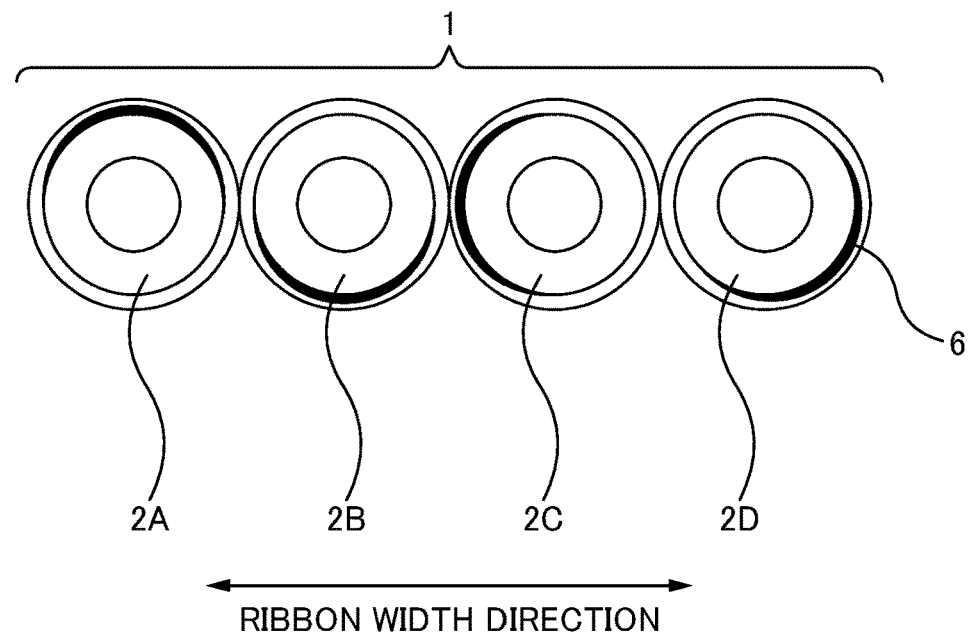
FIG. 3 is a cross-sectional view of an optical fiber ribbon according to an embodiment, taken along line A-A.
Figure 4:
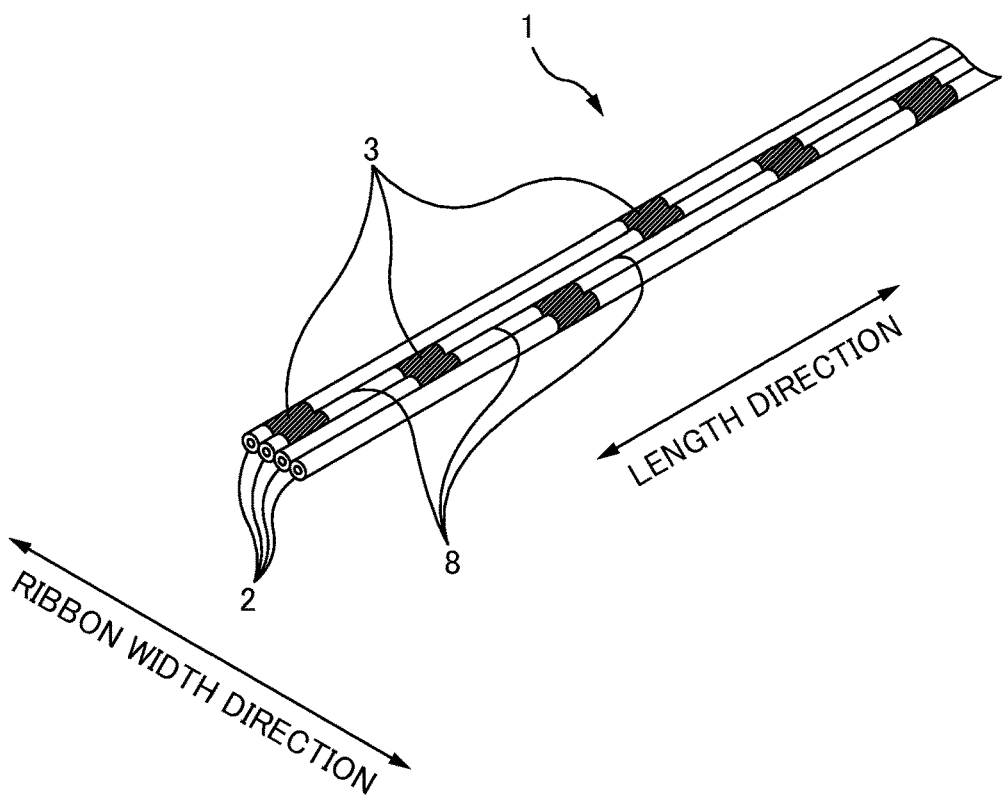
FIG. 4 is a diagram illustrating an example of an intermittently connected optical fiber ribbon 1.

{Optical Fiber Ribbon}
Configuration:

FIG. 1 is a perspective view of an optical fiber ribbon 1 according to the present embodiment. FIG. 2A is a plan view of the optical fiber ribbon 1 according to the present embodiment. FIG. 2B is a diagram illustrating examples (Identification Nos. 1 to 12) of markings 6. FIG. 3 is a cross-sectional view of the optical fiber ribbon according to the present embodiment, taken along line A-A. FIG. 4 is a diagram illustrating an example of an intermittently connected optical fiber ribbon 1.

These figures illustrate jacketed optical fibers 2 (2A to 2D). However, a "jacketed optical fiber 2" may be referred to simply as an optical fiber. A jacketed optical fiber 2 is made by providing a secondary coating on a bare optical fiber. Alternatively, a "jacketed optical fiber 2" may be referred to as a primary-coated optical fiber.

As illustrated in these figures, the optical fiber ribbon 1 of the present embodiment includes: four jacketed optical fibers 2A to 2D arranged side by side; and connection parts 6 that each connect two adjacent ones of the jacketed optical fibers 2. As illustrated in FIG. 4 (note that markings 6 are omitted from FIG. 4 to illustrate the connection parts 3), between two adjacent jacketed optical fibers 2, a plurality of connection parts 3 are arranged intermittently in the length direction. The plurality of connection parts 3 of the optical fiber ribbon 1 are arranged intermittently and two-dimensionally in the length direction and the ribbon's width direction.

The connection parts 3 connect two adjacent jacketed optical fibers 2 by, e.g., an ultraviolet-curable resin or a thermoplastic resin. Regions other than the connection parts 3 between the two adjacent jacketed optical fibers 2 constitute non-connected parts 8. In the non-connected parts 8, the two adjacent jacketed optical fibers 2 are not restrained. Thus, the optical fiber ribbon 1 can be rolled up into a cylindrical form (a bundle), or folded up, and the multitude of jacketed optical fibers 2 can be bundled with high density.

The intermittently connected optical fiber ribbon 1 is not limited to the example illustrated in FIGS. 1 to 4. For example, the number of jacketed optical fibers 2 constituting the intermittently connected optical fiber ribbon 1 may be changed (e.g., to eight fibers or twelve fibers). Also, the arrangement of the connection parts 3 may be changed.

Markings 6 are provided for identifying/distinguishing a certain optical fiber ribbon from other optical fiber ribbons. The size (width) of each marking 6 is about 3 to 30 mm in the length direction of the jacketed optical fiber 2. A plurality of markings 6 are printed as a set. The optical fiber ribbon is identified by the number of markings 6. The width of the markings 6 does not have to be the same; for example, as illustrated in FIG. 2B, marks with different widths may be used in combination. The marking 6 may have a wavy form. The color of the markings 6 does not have to be the same, and markings with different colors may be used in combination.

The position, in the optical fiber's circumferential direction, of the marking 6 provided to at least one of the jacketed optical fibers 2 is different from the position, in the optical fiber's circumferential direction, of the marking provided to another jacketed optical fiber 2. More specifically, as illustrated in the figures, the markings 6 provided to the respective jacketed optical fibers 2A to 2D are positioned so that they face different directions in terms of the circumferential direction. Herein, the markings 6 on the respective jacketed optical fibers 2A to 2D are not positioned uniformly in the circumferential direction, but are arranged randomly.

According to this optical fiber ribbon 1, the position, in the circumferential direction, of the marking 6 provided to at least one of the jacketed optical fibers 2 is different from the position, in the circumferential direction, of the marking 6 provided to another jacketed optical fiber 2. Therefore, even in cases where a marking 6 of a certain jacketed optical fiber 2 is blocked by adjacent jacketed optical fibers 2 and is difficult to observe, the marking 6 on another jacketed optical fiber 2 can be visually recognized. Thus, the identifiability of the optical fiber ribbon 1 can be improved.

For example, even in cases where there is an optical fiber whose marking 6 cannot be visually recognized at all, like the optical fiber 2C in FIG. 2A, the markings 6 on the optical fibers 2A, 2B, and 2D can be visually recognized. Further, when the optical fiber ribbon is viewed from the back side of FIG. 2A, the marking 6 on the optical fiber 2C can be visually recognized.

Figure 5A:
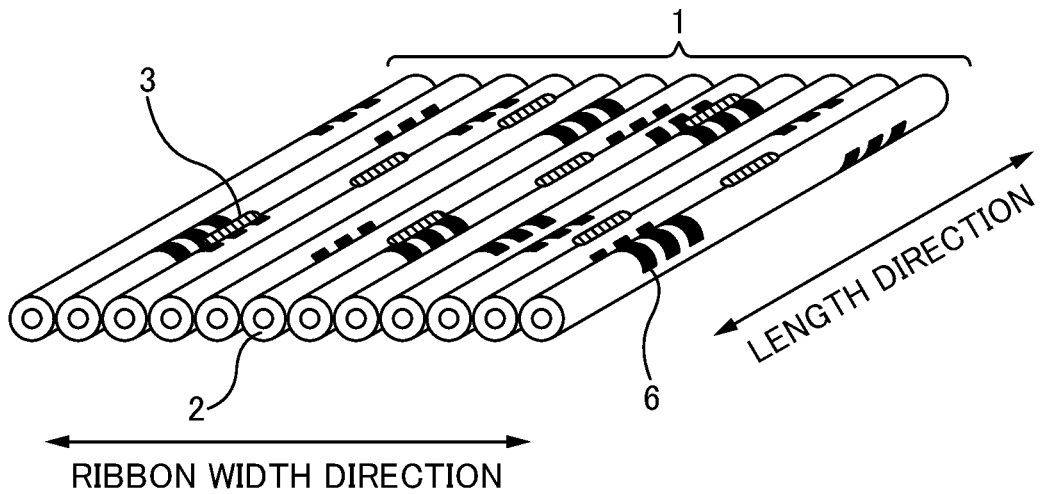
FIG. 5A is a perspective view of a 12-fiber optical fiber ribbon 1.
Figure 5B:
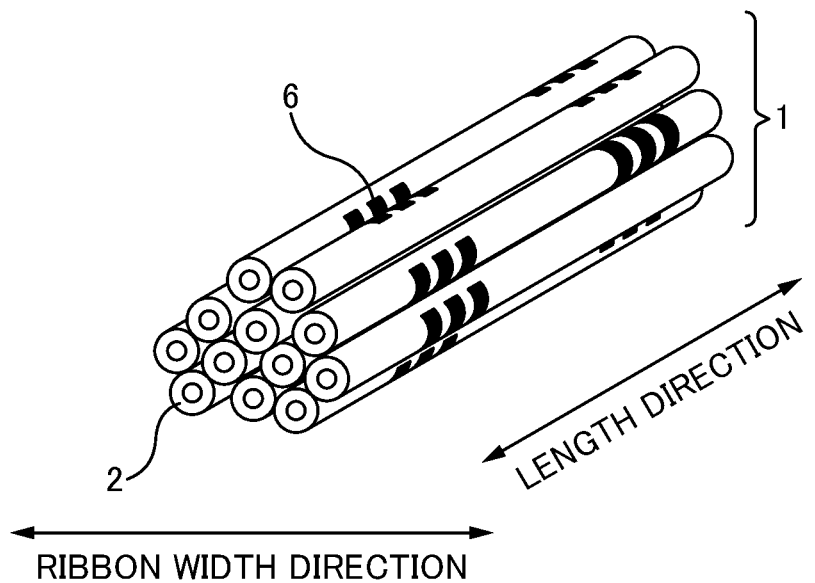
FIG. 5B is a perspective view when the 12-fiber optical fiber ribbon 1 is bundled up.

FIG. 5A is a perspective view of a 12-fiber optical fiber ribbon 1. FIG. 5B is a perspective view when the 12-fiber optical fiber ribbon 1 is bundled up. In order to demonstrate the effect of the present embodiment more clearly, FIGS. 5A and 5B illustrate a 12-fiber optical fiber ribbon 1 instead of the aforementioned 4-fiber optical fiber ribbon 1.

The positions, in the circumferential direction, of the respective markings 6 on each of the jacketed optical fibers 2 of the optical fiber ribbon 1 illustrated in FIG. 5A are random, and completely lack unity. FIG. 5B illustrates a state in which the optical fiber ribbon 1—in which the positions, in the circumferential direction, of the respective markings 6 lack unity—is bundled up. Because the positions, in the circumferential direction, of the respective markings 6 are random, the markings 6 on some of the jacketed optical fibers 2 can be visually recognized from the periphery, even when the optical fiber ribbon 1 is bundled up.

Figure 6A:
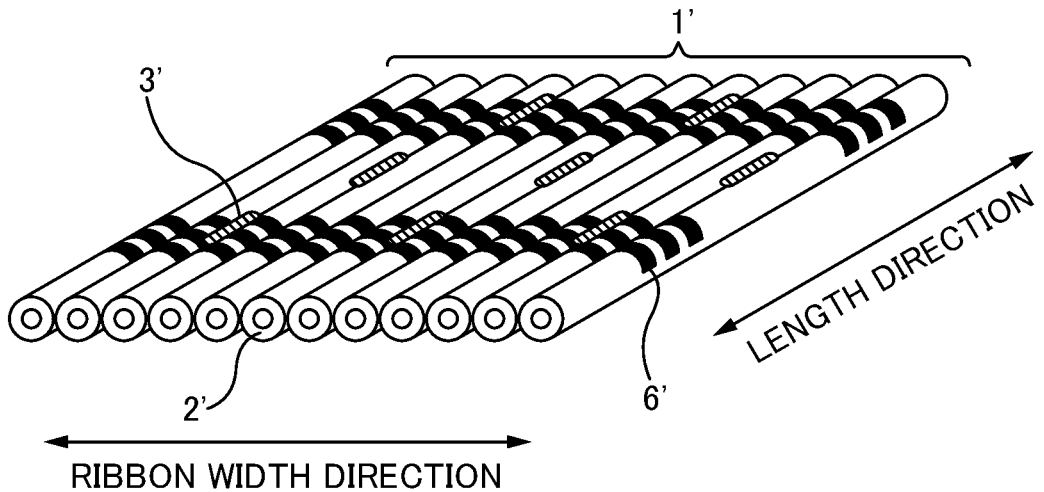
FIG. 6A is a perspective view of an optical fiber ribbon 1' according to a reference example.
Figure 6B:
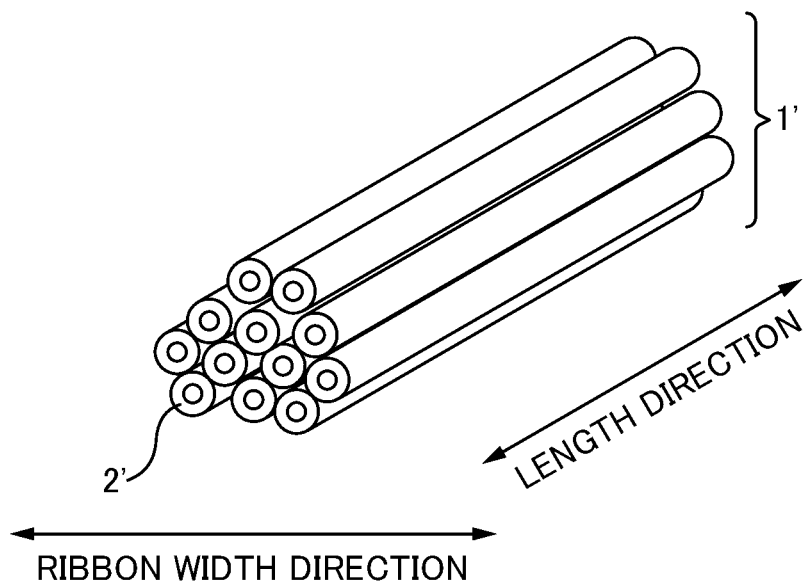
FIG. 6B is a perspective view when the optical fiber ribbon 1' according to the reference example is bundled up.

FIG. 6A is a perspective view of an optical fiber ribbon 1' according to a reference example. FIG. 6B is a perspective view when the optical fiber ribbon 1' according to the reference example is bundled up. FIGS. 6A and 6B also illustrate a 12-fiber optical fiber ribbon 1' in order to clearly indicate the difference from the present embodiment.

In the optical fiber ribbon 1' of the reference example, the markings 6' are provided only on the upper surface side of the respective jacketed optical fibers 2. FIG. 6B illustrates a state in which this optical fiber ribbon 1' is bundled up such that the ribbon's upper surface faces inward. As illustrated in the figure, because the positions of the markings 6' are uniform and face only toward the upper surface side, it is absolutely impossible, or extremely difficult, to visually recognize the markings 6' when the ribbon is bundled up such that the upper surface faces inward. In contrast, according to the optical fiber ribbon 1 of the present embodiment as illustrated in FIGS. 5A and 5B, visual recognizability is less likely to be impaired even when the optical fiber ribbon 1 is bundled up.

It should be noted that, although the present embodiment describes an example of a jacketed optical fiber 2 in which three markings 6 are printed as a set, the number of markings 6 is not limited thereto. Other than by varying the number of markings 6, the optical fiber ribbons may be made distinguishable from one another by varying the shapes of the markings among optical fiber ribbons.

Figure 7:
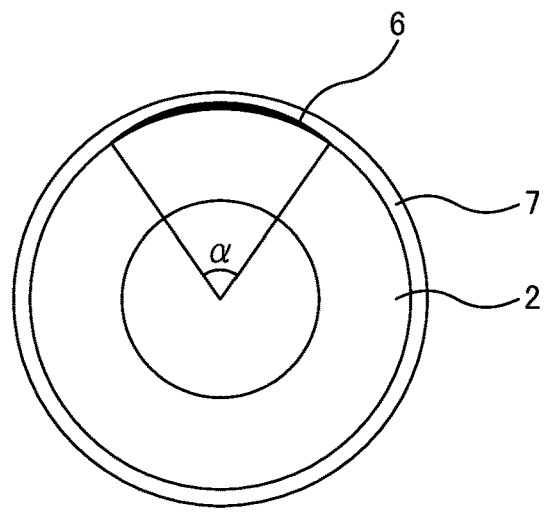
FIG. 7 is a diagram illustrating the circumferential angle of a marking 6.

FIG. 7 is a diagram illustrating the circumferential angle of a marking 6. FIG. 7 illustrates a cross section of a single optical fiber 2. The figure also illustrates a marking 6 and a colored layer 7 of the optical fiber 2, and also illustrates the marking 6's circumferential angle α from the center of the optical fiber 2.

In the present embodiment, the circumferential angle α is preferably about 100 to 120 degrees, but may be smaller. For example, the circumferential angle α may be within a range from 60 to 70 degrees.

As illustrated in FIG. 7, a colored layer 7 is formed on each jacketed optical fiber 2. The colored layers 7 of the respective jacketed optical fibers 2A to 2D are formed so as to have different colors from one another. The marking 6 is formed under the colored layer 7. In this way, the marking 6 is protected by the colored layer 7, and thus, the marking 6 can be made less prone to come off.

Figure 8:
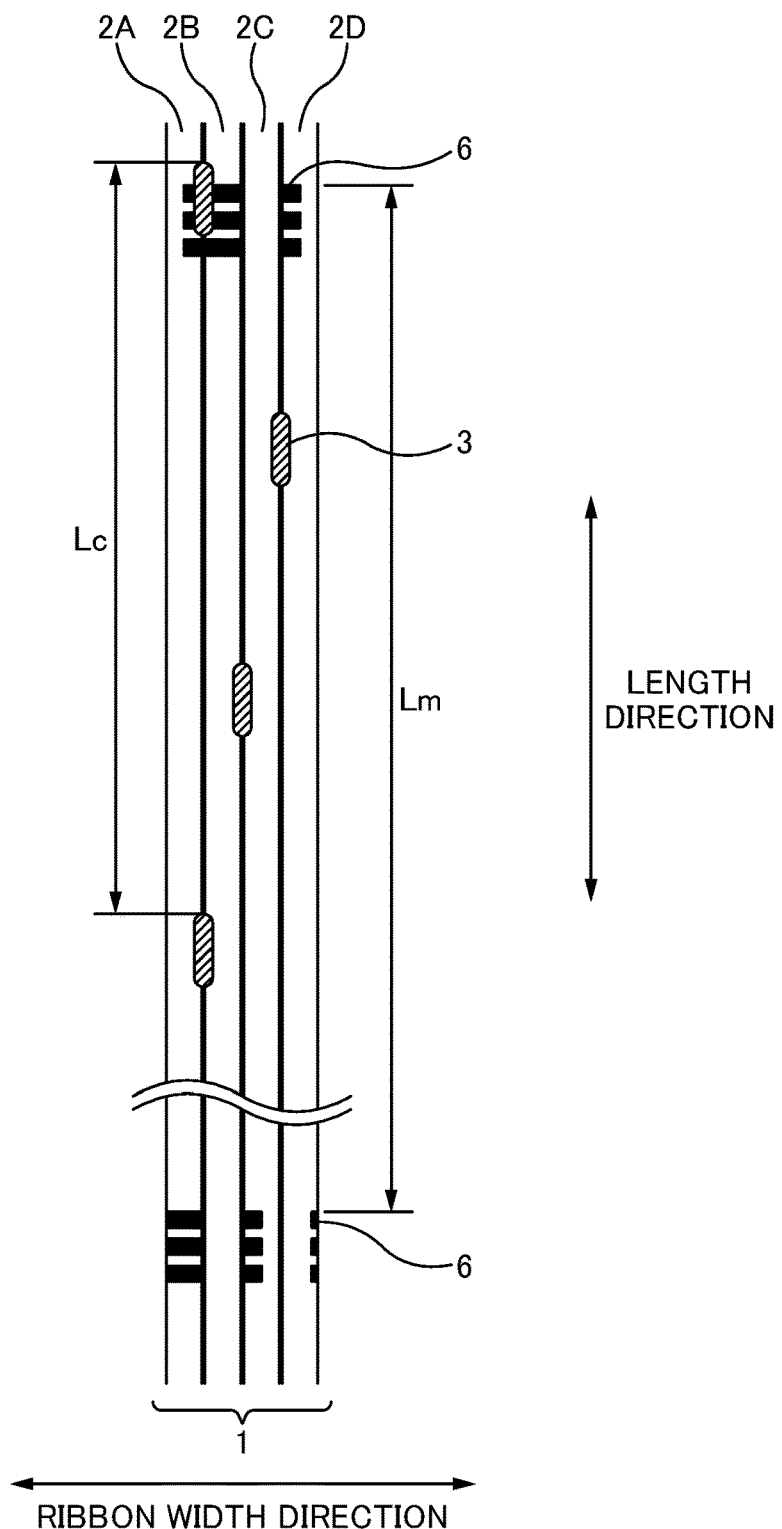
FIG. 8 is a diagram illustrating how markings 6 are arranged.

FIG. 8 is a diagram illustrating how the markings 6 are arranged. FIG. 8 illustrates an example of a distance Lm between markings 6, and a distance Lc between connection parts 3. In the present embodiment, the distance Lm between markings 6 is greater than the distance Lc between connection parts 3. For example, the distance Lm between markings 6 may be about 150 mm, and the distance Lc between connection parts 3 may be about 40 mm to 100 mm.

As a matter of course, the positions of the markings 6 formed on the respective jacketed optical fibers 2A to 2D substantially match one another in the length direction of the jacketed optical fibers 2. On the other hand, the positions of the connection parts 3 are varied in the length direction of the respective jacketed optical fibers 2A to 2D.

FIG. 8 also illustrates that, in a certain one of the jacketed optical fibers 2, a plurality of markings 6 provided respectively at different positions in the length direction of the certain jacketed optical fiber 2 are formed respectively at different positions in the circumferential direction. In this way, the positions of the markings 6 in the circumferential direction can be made more random.

The above describes that the positions, in the circumferential direction, of adjacent markings 6 are to be arranged randomly. However, the circumferential-direction arrangement does not necessarily have to be random. It is only necessary that the position, in the circumferential direction, of the marking 6 provided to at least one of the jacketed optical fibers 2 is different from the position, in the circumferential direction, of the marking 6 provided to another jacketed optical fiber 2. In this way, even in cases where a marking 6 of a certain jacketed optical fiber 2 is blocked by adjacent jacketed optical fibers 2 and is difficult to observe, the marking 6 on another jacketed optical fiber 2 can be visually recognized. Thus, the identifiability of the optical fiber ribbon 1 can be improved.

Figure 9:
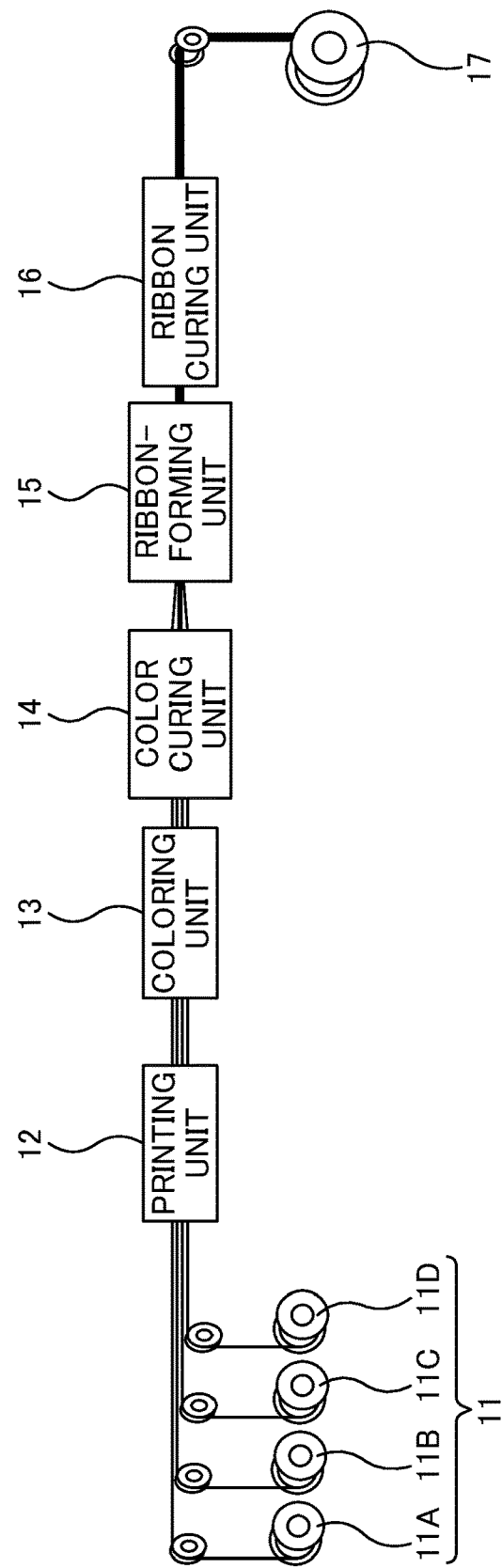
FIG. 9 is a diagram illustrating steps for producing an optical fiber ribbon 1 according to an embodiment.

Production Steps:

FIG. 9 is a diagram illustrating steps for producing an optical fiber ribbon 1 according to the present embodiment. The figure illustrates a feeding device 11, a printing unit 12, a coloring unit 13, a color curing unit 14, a ribbon-forming unit 15, a ribbon curing unit 16, and a take-up drum 17 which are used in the steps for producing the optical fiber ribbon 1.

The feeding device 11 includes feeding drums 11A to 11D on which the jacketed optical fibers 2A to 2D are respectively wound. The number of feeding drums 11A to 11D matches the number of jacketed optical fibers 2A to 2D included in the optical fiber ribbon 1; thus, in this example, four feeding drums 11A to 11D are provided. The feeding drums 11A to 11D feed the four jacketed optical fibers 2A to 2D, respectively.

The printing unit 12 prints the aforementioned markings on a portion, in the jacketed optical fiber's length direction, of the respective four jacketed optical fibers 2A to 2D fed out from the respective feeding devices 11A to 11D. For example, an inkjet printer may be employed for the printing unit 6, but it is more preferable to employ a printing device that transfers an ink from a roller respectively to the plurality of jacketed optical fibers, because printing can be performed simultaneously to a plurality of jacketed optical fibers at high speed with a single printing device.

The printing unit 6 does not print the marking 6 to the entire circumference, in the circumferential direction, of each jacketed optical fiber 2, but prints the marking only on one side. Thus, at the printing unit 12, the markings 6 of the respective four jacketed optical fibers 2A to 2D face the same direction in the circumferential direction.

The coloring unit 13 applies coloring agents having different colors from one another to the respective four jacketed optical fibers 2A to 2D. Ultraviolet-curable resin is employed for the coloring agents. For example, blue, white, yellow, and gray ultraviolet-curable resins are applied respectively to the four optical fibers. By applying different coloring agents respectively to the four jacketed optical fibers 2A to 2D, the jacketed optical fibers 2A to 2D in a single optical fiber ribbon 1 can be distinguished from one another.

As described above, optical fiber ribbons 1 are identified/distinguished from one another by the markings 6, whereas the jacketed optical fibers in a single optical fiber ribbon 1 are distinguished from one another by the color of the respective colored layer.

One of the reasons that the printing unit 12 is arranged upstream of the coloring unit 13 in the transporting direction of the jacketed optical fibers 2 is because it is difficult to perform printing after coloring. If the markings 6 were to be printed after coloring, the markings 6 would slightly protrude in the radial direction of each jacketed optical fiber 2. Such protrusions may get snagged on various sliding parts in the production steps described below, which may lead to production defects. In contrast, by forming the colored layer 7 after printing the markings 6, no protrusions are created, and thus, the possibility of production defects can be reduced significantly. Also, in this way, the markings 6 can be protected by the colored layer 7.

Also, by arranging the printing unit 12 on the upstream side, the distance from the printing unit 12 to the ribbon-forming unit 15 can be increased. By increasing the distance from the printing unit 12 to the ribbon-forming unit 15, the amount of rotation of each optical fiber can be increased—and thus the position of the marking 6 can be further shifted in the circumferential direction—until each optical fiber reaches the ribbon-forming unit 15. Thus, the positions of the respective markings 6 can be made more random among the plurality of jacketed optical fibers 2. Also, the positions, in the circumferential direction, of respective markings 6 in a single jacketed optical fiber 2 can be made more random.

The color curing unit 14 irradiates the ultraviolet-curable resin applied by the aforementioned coloring unit 13 with ultraviolet rays, and cures the resin.

The ribbon-forming unit 15 applies ultraviolet-curable resin between adjacent jacketed optical fibers 2 at predetermined intervals in the length direction of the jacketed optical fibers 2, in order to form the aforementioned connection parts 3. The jacketed optical fibers 2A to 2D provided with the ultraviolet-curable resin pass through the ribbon curing unit 16. The ribbon curing unit 16 irradiates the uncured connection parts 3 with ultraviolet rays, and cures the ultraviolet-curable resin in the connection parts 3.

While the jacketed optical fibers 2 are transported from the printing unit 12 to the ribbon-forming unit 15, the positions of the markings are shifted randomly in the circumferential direction. As a result, when the connection parts 3 are cured by the ribbon-forming unit 15, the position, in the circumferential direction, of the marking 6 provided to at least one of the jacketed optical fibers 2 is made different from the position, in the circumferential direction, of the marking 6 provided to another jacketed optical fiber 2.

The optical fiber ribbon 1 produced as above is taken up by the take-up drum 17. The optical fiber ribbon 1 is taken up by a single take-up drum 17. Thus, tension applied to the jacketed optical fibers 2A to 2D is applied by the take-up drum 17; because a single take-up drum 17 takes up the four jacketed optical fibers 2A to 2D, the tension applied to each of these jacketed optical fibers is substantially the same.

Thus, even after the formation of the markings 6 on the respective jacketed optical fibers 2A to 2D, the jacketed optical fibers 2A to 2D are transported downstream at substantially the same speed. Thus, the positions of the markings 6 on the respective jacketed optical fibers 2A to 2D are all located at substantially the same position in the length direction of the optical fiber ribbon 1, even when they are taken up as an optical fiber ribbon 1.

On the other hand, during the course in which the jacketed optical fibers 2A to 2D are fed out from the respective feeding drums 11A to 11D and reach the ribbon-forming unit 15 while undergoing various steps, each of the jacketed optical fibers 2 is transported while rotating clockwise or counterclockwise about its core. This occurs because of, e.g., force produced by the uncurling of the jacketed optical fibers 2 when they are fed out from the respective feeding drums 11, and individual variations among the production devices used for applying the aforementioned production steps to the four jacketed optical fibers 2A to 2D. Another reason is considered to be the difference in force applied to the respective jacketed optical fibers 2 when the jacketed optical fibers 2—which were separate from one another in the color curing unit 14—are gathered together in the ribbon-forming unit 15.

In the printing unit 12, the markings 6 are printed on the four jacketed optical fibers 2 so as to face the same direction in the circumferential direction. However, due to the aforementioned mechanical action occurring in the circumferential direction, each jacketed optical fiber 2 separately undergoes individual rotational displacement. Also, because there is a long distance until the jacketed optical fibers 2 reach the ribbon-forming unit 15, the four jacketed optical fibers 2 separately rotate in the circumferential direction by different amounts. Thus, when the optical fibers reach the ribbon-forming unit 15, the position, in the circumferential direction, of the marking 6 provided to at least one of the jacketed optical fibers 2 becomes different from the position, in the circumferential direction, of the marking 6 provided to another jacketed optical fiber 2.

In the present example, the jacketed optical fibers 2 were made to rotate separately in the circumferential direction by different amounts by employing the curling created in the fibers by the feeding drums, individual variations among devices, and the difference in force applied to the jacketed optical fibers 2, as described above. However, it is instead possible to provide a device that makes the jacketed optical fibers 2A to 2D rotate separately in the circumferential direction by different amounts, and rotationally displace each of the jacketed optical fibers 2 actively in the circumferential direction by different amounts.

Figure 10:
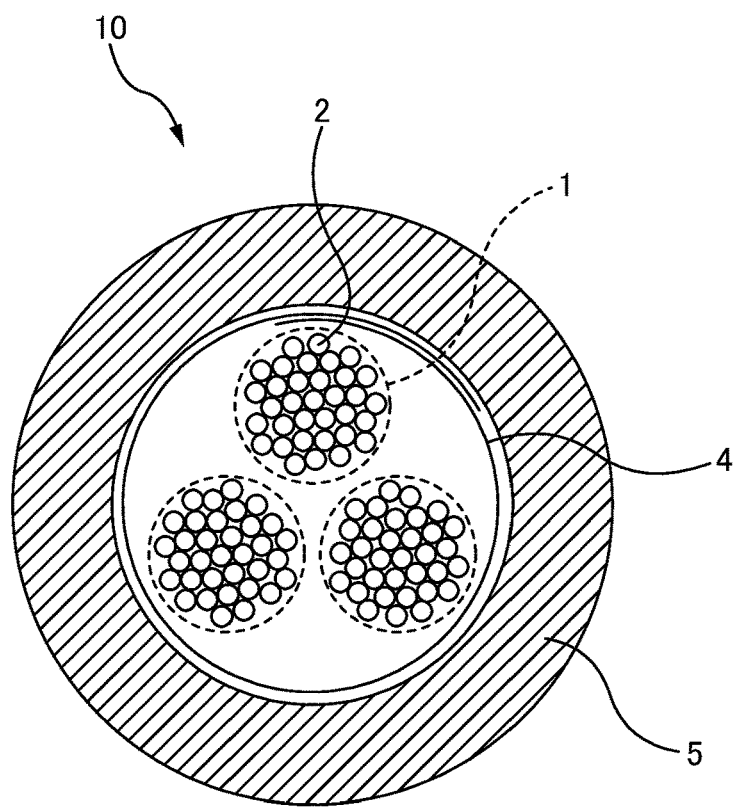
FIG. 10 is a diagram illustrating an optical fiber cable 10 according to an embodiment.

FIG. 10 is a diagram illustrating an optical fiber cable according to the present embodiment. An optical fiber cable 10 can be produced by: gathering a plurality of optical fiber ribbons 1 produced by the aforementioned production steps; winding a wrapping tape 4 around the ribbons; and covering the wrapping tape 4 with a sheath 5. Even when a plurality of optical fiber ribbons 1 are gathered together, the optical fiber ribbons 1 can be distinguished from one another because the respective optical fiber ribbons have different numbers of markings 6.

As regards the optical fiber ribbon 1, the position, in the circumferential direction, of the marking provided to at least one of the jacketed optical fibers 2 is different from the position, in the circumferential direction, of the marking provided to another jacketed optical fiber. Therefore, even in cases where a marking of a certain jacketed optical fiber is blocked by adjacent optical fibers and is difficult to observe, the marking on another jacketed optical fiber can be visually recognized. Thus, the identifiability of the optical fiber ribbon 1 can be improved.

{Others}

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

REFERENCE SIGNS LIST

1: Optical fiber ribbon;
2: Jacketed optical fiber;
3: Connection part;
4: Wrapping tape;
5: Sheath;
6: Marking;
7: Colored layer;
8: Non-connected part;
10: Optical fiber cable;
11: Feeding device;
12: Printing unit;
13: Coloring unit;
14: Color curing unit;
15: Ribbon-forming unit;
16: Ribbon curing unit;
17: Take-up drum.

The invention claimed is:

1. An optical fiber ribbon comprising:
   at least three optical fibers arranged side by side so as to be bisected by a virtual plane; and
   a plurality of connection parts that each connect two adjacent ones of the optical fibers,
   the connection parts being provided intermittently in a length direction of the optical fibers and in a width direction of the optical fibers, wherein:
   a marking for identifying the optical fiber ribbon is provided to each optical fiber on a circumferential portion thereof; wherein
   the marking provided to at least one of the optical fibers is positioned on a different circumferential portion than the marking provided to another optical fiber in a direction perpendicular to an extension direction of the optical fiber ribbon, and wherein
   the markings provided to each optical fiber are discontinuous around a circumferential portion thereof.

2. The optical fiber ribbon according to claim 1, wherein:
   a plurality of the markings are provided respectively at different positions in the length direction of a certain one of the optical fibers; and
   the markings of the certain optical fiber are formed respectively at different positions in the circumferential direction.

3. The optical fiber ribbon according to claim 1, wherein:
   a colored layer is formed on each of the optical fibers, the colored layers of the respective optical fibers having different colors from one another; and
   each marking is formed under the colored layer.

4. An optical fiber cable made by covering a plurality of the optical fiber ribbons according to claim 1 with a sheath.

* * * * *